United States Patent
Paliwal et al.

(10) Patent No.: US 12,118,590 B2
(45) Date of Patent: *Oct. 15, 2024

(54) REAL-TIME BIDDING

(71) Applicant: LoopMe, Ltd., London (GB)

(72) Inventors: Piyush Paliwal, London (GB); Oleksii Renov, London (GB); Leonard Newnham, London (GB)

(73) Assignee: LoopMe, Ltd., London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/208,634

(22) Filed: Jun. 12, 2023

(65) Prior Publication Data

US 2023/0325886 A1    Oct. 12, 2023

Related U.S. Application Data

(63) Continuation of application No. 17/296,195, filed as application No. PCT/GB2019/053296 on Nov. 21, 2019, now Pat. No. 11,798,040.

(30) Foreign Application Priority Data

Nov. 21, 2018 (GB) ...................................... 1818949

(51) Int. Cl.
*G06Q 30/02* (2023.01)
*G06N 20/00* (2019.01)
(Continued)

(52) U.S. Cl.
CPC ......... *G06Q 30/0275* (2013.01); *G06N 20/00* (2019.01); *G06Q 10/06315* (2013.01); *G06Q 30/0249* (2013.01)

(58) Field of Classification Search
CPC ......... G06Q 30/0275; G06Q 10/06315; G06Q 30/0249; G06N 20/00; G06N 7/01; G06N 20/20

See application file for complete search history.

(56) References Cited

U.S. PATENT DOCUMENTS

| | | | |
|---|---|---|---|
| 2011/0246289 A1* | 10/2011 | Bowman | G06Q 30/06 705/37 |
| 2012/0084142 A1* | 4/2012 | Li | G06Q 30/02 705/14.46 |

(Continued)

OTHER PUBLICATIONS

Natekin et al., Gradient boosting machines, a tutorial, Dec. 4, 2013, Frontiers in Neurorobotics, pp. 1-21 (Year: 2013).*

(Continued)

*Primary Examiner* — John Van Bramer
(74) *Attorney, Agent, or Firm* — J. Steven Svoboda

(57) ABSTRACT

The demand-side platform (DSP) is a technological ingredient that fits into the larger real-time-bidding (RTB) ecosystem. DSPs enable advertisers to purchase ad impressions from a wide range of ad slots, generally via a second-price auction mechanism. In this aspect, predicting the auction winning price notably enhances the decision for placing the right bid value to win the auction and helps with the advertiser's campaign planning and traffic reallocation between campaigns. This is a difficult task because the observed winning price distribution is biased due to censorship; the DSP only observes the win price in the case of winning the auction. For losing bids, the win price remains censored. In this invention, we generalize the winning price model to incorporate a gradient boosting framework adapted to learn from both observed and censored data. This yields a boost in predictive performance in comparison to classic linear censored regression.

7 Claims, 8 Drawing Sheets

(51) Int. Cl.
    *G06Q 10/0631*    (2023.01)
    *G06Q 30/0241*    (2023.01)
    *G06Q 30/0273*    (2023.01)

(56) References Cited

U.S. PATENT DOCUMENTS

| | | | | |
|---|---|---|---|---|
| 2014/0006171 | A1* | 1/2014 | Jordan | G06Q 30/08 |
| | | | | 705/14.71 |
| 2017/0091829 | A1* | 3/2017 | Siegler | G06Q 30/0277 |
| 2018/0150886 | A1* | 5/2018 | Wang | G06Q 30/0254 |
| 2018/0204250 | A1* | 7/2018 | Watine | G06Q 30/0275 |

OTHER PUBLICATIONS

Saberian et al., TaylorBoost: First and second-order boosting algorithms with explicit margin control, 2011, Conference on Computer Vision and Pattern Recognition (CVPR) 2011, pp. 2929-2934 (Year: 2011).*

Baydin et al., Online Learning Rate Adaptation with Hypergradient Descent, Feb. 26, 2018, https://arxiv.org/pdf/1703.04782.pdf, International Conference on Learning Representations (ICLR) 2018, pp. 1-11 (Year: 2018).*

Olson, Essays on Random Forest Ensemble, Jan. 2018, Publicly Accessible Penn Dissertations, University of Pennsylvania, https://repository.upenn.edu/cgi/viewcontent.cgi?article=4519&context=edissertations, pp. 1-158 (Year: 2018).*

* cited by examiner

Table 1. The statistics for the simulated dataset of iPinYou Season 2.

| Day | # of bids | # of win bids | WR | AWP | AWP_$\mathcal{W}$ | AWP_$\mathcal{L}$ |
|---|---|---|---|---|---|---|
| 2013-06-06 | 1,821,479 | 1,514,416 | 0.83 | 74.8649 | 52.4677 | 185.3269 |
| 2013-06-07 | 1,806,062 | 1,524,314 | 0.84 | 72.3127 | 51.1205 | 186.9674 |
| 2013-06-08 | 1,634,967 | 1,352,038 | 0.83 | 81.1431 | 58.4850 | 189.4200 |
| 2013-06-09 | 1,651,630 | 1,366,097 | 0.83 | 81.3166 | 58.9570 | 188.2934 |
| 2013-06-10 | 1,920,576 | 1,603,798 | 0.84 | 79.8357 | 58.9134 | 185.7621 |
| 2013-06-11 | 1,745,905 | 1,461,085 | 0.84 | 79.6226 | 58.9162 | 185.8431 |
| 2013-06-12 | 1,657,578 | 1,378,728 | 0.83 | 79.9969 | 58.8019 | 184.7920 |

Fig. 6

Table 2. The statistics for the simulated dataset of iPinYou Season 3.

| Day | # of bids | # of win bids | WR | AWP | AWP_$\mathcal{W}$ | AWP_$\mathcal{L}$ |
|---|---|---|---|---|---|---|
| 2013-10-19 | 228,133 | 170,739 | 0.75 | 86.7368 | 50.8938 | 193.3647 |
| 2013-10-20 | 214,295 | 159,646 | 0.74 | 87.8986 | 51.9533 | 192.9054 |
| 2013-10-21 | 848,760 | 621,626 | 0.73 | 90.0886 | 51.4093 | 195.9472 |
| 2013-10-22 | 681,700 | 503,108 | 0.74 | 91.5107 | 52.8885 | 200.3125 |
| 2013-10-23 | 226,791 | 170,850 | 0.75 | 89.2730 | 53.4484 | 198.6853 |
| 2013-10-24 | 245,897 | 197,279 | 0.80 | 74.1881 | 45.5880 | 190.2397 |
| 2013-10-25 | 318,240 | 245,671 | 0.77 | 82.2756 | 49.1967 | 194.2589 |
| 2013-10-26 | 268,380 | 198,709 | 0.74 | 89.6127 | 49.1872 | 204.9104 |
| 2013-10-27 | 110,467 | 84,730 | 0.77 | 86.0095 | 48.4357 | 209.7080 |

Fig. 7

Table 3. Bayesian optimization experiments results on day 2013-06-10

| Model Name | Validation RMSE with different configurations of parameters | | | | | |
|---|---|---|---|---|---|---|
| XCR2 | eta | max_depth | gamma | colsample | subsample | RMSE |
| | 0.169 | 65 | 11.0 | 0.83 | 1.0 | 37.38 |
| | 0.13 | 41 | 7.5 | 0.41 | 0.80 | 39.93 |
| | 0.08 | 54 | 8.3 | 0.81 | 0.40 | 40.17 |
| XCR1 | eta | $L_2$ reg | RMSE | | | |
| | 0.09 | 0.2 | 39.57 | | | |
| | 0.05 | 0.5 | 40.60 | | | |
| | 0.15 | 1.0 | 42.66 | | | |
| LCR | eta | $L_2$ reg | RMSE | | | |
| | 0.03 | 0.5 | 39.98 | | | |
| | 0.1 | 0.8 | 42.50 | | | |
| | 0.08 | 0.61 | 42.63 | | | |

Fig. 8

Table 4. Root mean squared error on testing set of simulated dataset of iPinYou Season 2.

| Day | RMSE all LCR XCR1 XCR2 | RMSE win LCR XCR1 XCR2 | RMSE lose LCR XCR1 XCR2 |
|---|---|---|---|
| 2013-06-06 | 45.59 46.44 43.91 | 25.63 25.59 24.43 | 95.57 98.02 92.36 |
| 2013-06-07 | 45.12 45.66 43.19 | 26.32 25.17 23.58 | 96.31 99.52 94.45 |
| 2013-06-08 | 47.06 47.84 46.14 | 24.53 24.47 23.78 | 99.35 101.53 97.73 |
| 2013-06-09 | 45.51 45.74 43.56 | 26.08 24.66 23.53 | 93.42 95.88 91.25 |
| 2013-06-10 | 41.31 40.41 38.10 | 22.03 21.91 20.51 | 88.86 86.43 81.70 |
| 2013-06-11 | 45.11 41.76 41.20 | 23.39 22.44 20.65 | 98.11 89.83 90.45 |
| 2013-06-12 | 41.19 42.06 39.80 | 24.27 22.61 21.36 | 85.22 89.95 85.19 |

Fig. 9

Table 5. Root mean squared error on testing set of simulated dataset of iPinYou Season 3.

| Day | RMSE all LCR XCR1 XCR2 | RMSE win LCR XCR1 XCR2 | RMSE lose LCR XCR1 XCR2 |
|---|---|---|---|
| 2013-10-19 | 59.61 60.09 57.46 | 33.96 34.34 32.56 | 103.29 104.04 99.74 |
| 2013-10-20 | 57.42 56.14 55.34 | 37.65 34.34 33.98 | 94.31 95.02 93.52 |
| 2013-10-21 | 57.48 55.97 54.83 | 40.15 35.36 33.80 | 89.33 91.30 90.33 |
| 2013-10-22 | 61.33 58.29 57.27 | 41.35 35.44 34.22 | 97.56 96.98 95.90 |
| 2013-10-23 | 59.36 59.07 57.64 | 38.88 37.24 36.20 | 98.23 99.45 97.19 |
| 2013-10-24 | 54.46 56.13 55.22 | 34.50 34.83 34.05 | 101.44 105.97 104.13 |
| 2013-10-25 | 56.42 57.89 55.67 | 34.90 35.95 34.12 | 98.42 100.81 97.47 |
| 2013-10-26 | 62.37 59.02 56.56 | 36.33 34.49 33.84 | 106.41 100.57 95.60 |
| 2013-10-27 | 61.61 58.24 56.63 | 34.88 32.40 31.75 | 110.54 105.09 101.93 |

Fig. 10

REAL-TIME BIDDING

CROSS-REFERENCE TO RELATED APPLICATIONS

The present application is a continuation application of U.S. patent application Ser. No. 17/296,195, filed May 21, 2021, entitled "Real-Time Bidding", the entire contents of which are incorporated herein by reference.

DETAILED DESCRIPTION

This invention relates to efficient use of bidding computer hardware resource in an automated real-time auction.

With growing popularity and usage, Real-time bidding (RTB) has monetized the advertising technology industry to a new scale. In a RTB auction process, buying and selling of online ad impressions are facilitated through an ad exchange in real time. Whenever a visitor lands on a publisher's webpage or app, an ad request is initiated for a particular ad slot. An instant auction is invoked at the ad exchange wherein participating ad vendors (advertisers) can place their bids. A demand-side platform (DSP) assists advertisers to gainfully set a bid value on an impression, based on how relevant the user is towards the potential ad to be served. In the auction, several advertisers bid with the help of DSPs acting on their behalf. The advertiser with the highest bid value wins the auction and pays the price set by second highest paying advertiser. The winner's ad is then displayed on the publisher's webpage or app. the entire auction process finishes in under 100 milliseconds, hence the name "real-time" emerged.

Many thousands of auctions may take place each second and have a duration of perhaps 100 ms. Thus the computer hardware resource required for each DSP to successfully enter and win an auction is significant and has significant costs. It is thus desirable to use that computer hardware resource efficiently.

In Wu, W. C. H., Yeh, M. Y., Chen, M. S.: "Predicting winning price in real time bidding with censored data". In: Proceedings of the 21th ACM SIGKDD International Conference on Knowledge Discovery and Data Mining. pp. 1305{1314. KDD '15, ACM, New York, NY, USA (2015), the authors modelled the censoring of the winning price from the side of the ad impression buyer. They addressed the winning price problem on the DSP side with censored regression. They built a linear censored regression model, a linear uncensored regression model and a winning rate mixture model to predict the winning price. These models prove problematic as described below.

In accordance with a first aspect of the invention, there is provided apparatus for reducing usage of computer hardware resource in an automated real-time auction, comprising a machine learning estimator arranged to receive historical data on the winning bids of previous auctions and also the losing bids of previous auctions and arranged to estimate the likely win price for a future auction, and a bid determinator arranged to receive data on a maximum bid price for the future auction and the estimated winning bid from the estimator, and arranged to cause the hardware resource (DSP) to be employed in entering the future auction when the budget is not less than the estimated win price.

From the advertiser's perspective, estimating the cost of winning the bid (aka the winning price) is important and guarantees the well-being of the ad inventory (a set of ad impressions the advertiser wishes to display to a suitable audience). Usually, the advertiser has a predefined campaign budget and the goal is to win ad impressions possessing the potential of returning more profit. More profit can be generated if a targeted ad impression has a high user response likelihood, where a response might be measured by, for example, click-through rate (CTR) or conversion rate (CVR). Hence, the advertiser should bid higher on an ad impression with higher user response likelihood. Within this factor, DSPs are bidding on behalf of their advertisers. They use pre-set buying parameters to determine a value for each incoming ad impression.

Thus DSPs being able to predict the winning price is important. When a DSP receives a request from an RTB it should respond with a bid price. The DSP usually has several campaigns which are competing against each other to be able to show their ad on a specific bid request. In such cases, the DSP computes separately an optimal bid price for each campaign ad, the importance of each ad to be shown and its influence on the campaign. On many DSPs, this process can be thought of as an internal auction system or ranking system which tries to find a winner ad. The bid price is not something which is fixed for the bid request, but it depends on the ad the DSP is considering sending back to the RTB. Often the DSP will have a highly ranked ad with a low bid price and this results in frequent sending of the same ad, which, in turn, produces bad ad delivery overall. However, if the DSP can better estimate the winning price of the next auction, overall delivery can be much smoother. Before responding to an ad request, the DSP can then check if the optimal bid price is greater than win price or not. If it is not, then there is no sense in sending back an ad with that bid price, and it is better to use this traffic and the DSP hardware resource for another campaign.

Preferably, the bid determinator receives a profit margin goal. The profit margin on an individual request is defined as the income from the advertiser for serving the ad minus the cost of display. The income from the advertiser will be agreed before the campaign is started. The cost of display is approximated by the estimated win price. The profit margin goal specifies the profit to be made running the campaign. In this way, the profit margin goal is used to adjust the threshold for the estimated win price to ensure that auctions are only won with a profit margin. The estimator may be arranged to create a set of training data from the historical data on the winning bids and the losing bids, to calculate an overall loss function based on the set, and to calculate first and second order derivatives of the overall loss function to generate a win price model.

Advantageously, the estimator is arranged to calculate a likelihood function of historical wins and a likelihood function of historical losses and to combine these functions to create the overall loss function. Typically, the estimator is arranged to generalise the win price model using gradient boosting.

By applying a gradient boosting framework adapted to censored regression for predicting the winning price on the DSP side, the performance of a winning price model in comparison to classic linear censored regression is enhanced.

As described in more detail below, the proposed gradient boosting censored regression (in particular tree based XCR2) addresses the complexity of winning bid price determination in an RTB environment and demonstrates superiority over classic linear censored regression.

Embodiments of the invention will now be described, by way of example, with reference to the drawings in which:—

Figure 2:
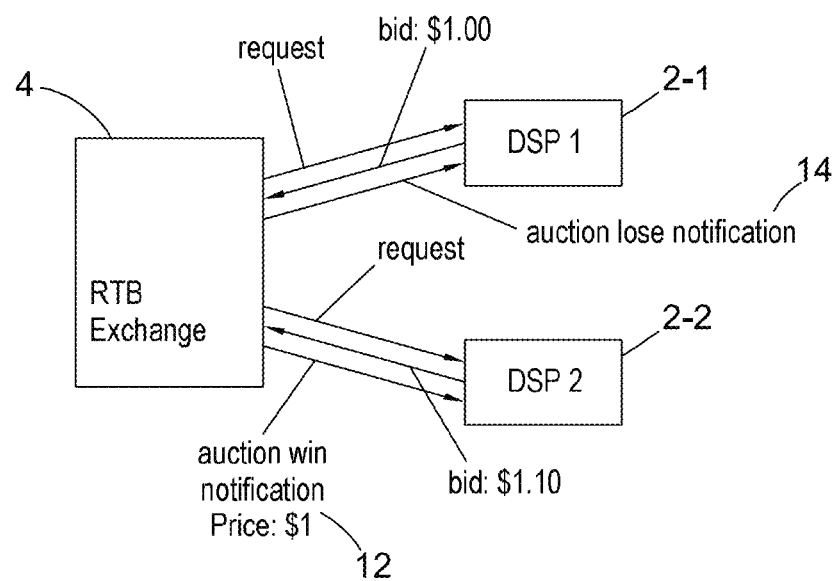
Figure 3:
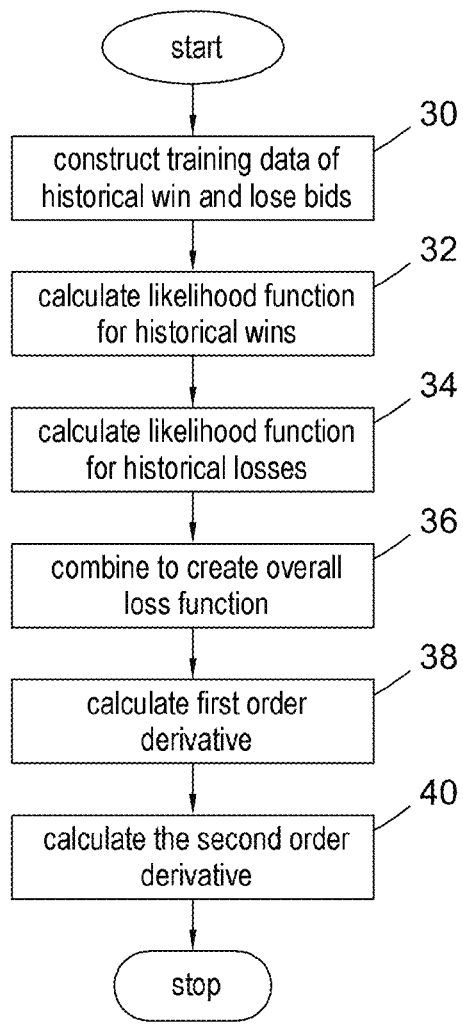
Figure 4:
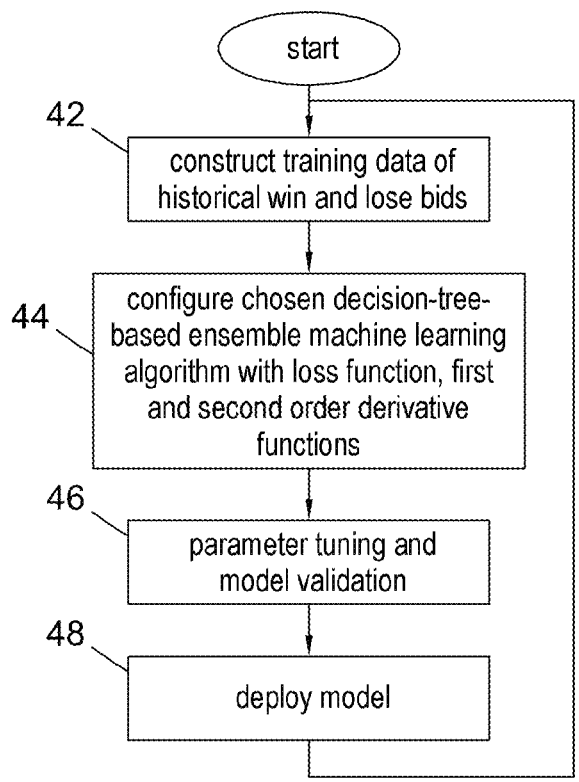
Figure 5:
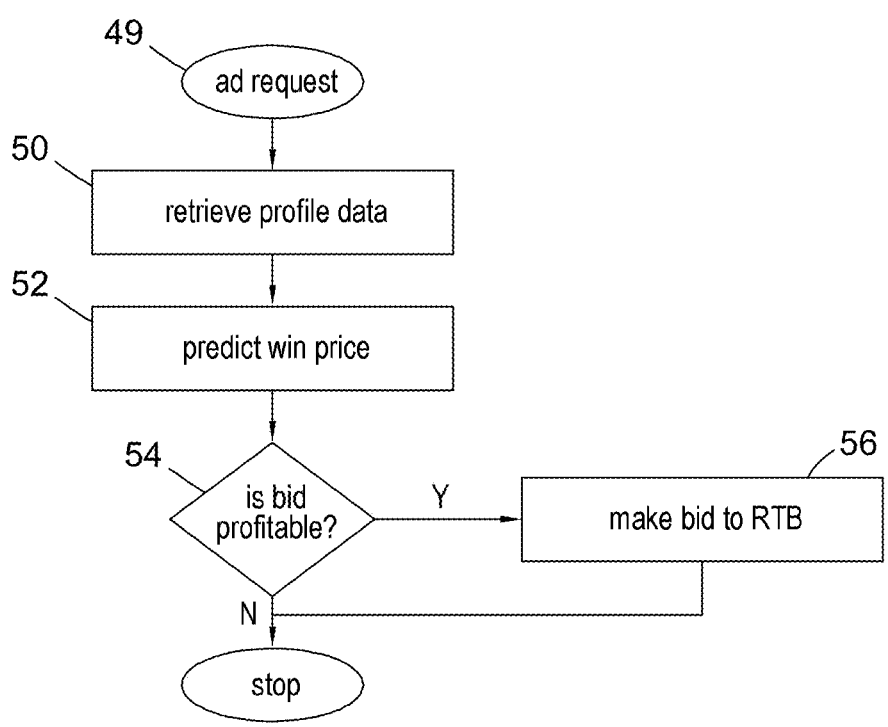
Figure 11:
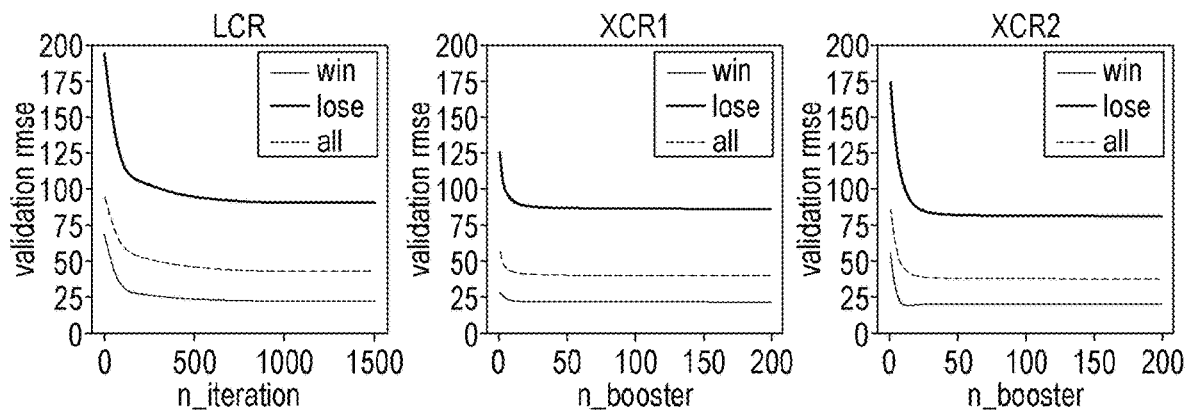
Figure 12:
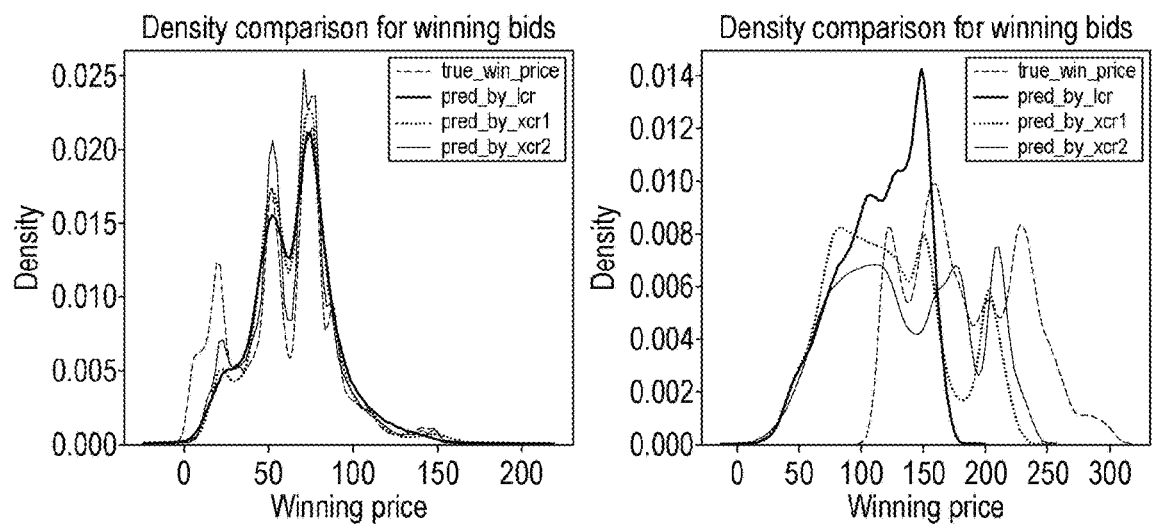

FIG. 2 is a schematic block diagram of the second price auction process and censoring of information, FIG. 3 is a flow chart showing the loss function and derivatives, FIG. 4 is a flowchart of the win price model updating process within the DSP, FIG. 5 is a flowchart of the scoring ad requests process within the DSP, FIG. 6 presents a first simulated dataset, FIG. 7 presents a second simulated dataset, FIG. 8 presents a sample of optimization results for different tuning models, FIG. 9 presents a first proposed gradient boosting censored regression model result, FIG. 10 presents a second proposed gradient boosting censored regression model result, FIG. 11 illustrates that smooth convergence for LCR, XCR1 and XCR2 are achieved, and FIG. 12 illustrates the linear model (in this example LCR an XCR1) not respecting the known bounds of win price and producing a small proportion of negative predictions.

Figure 1:
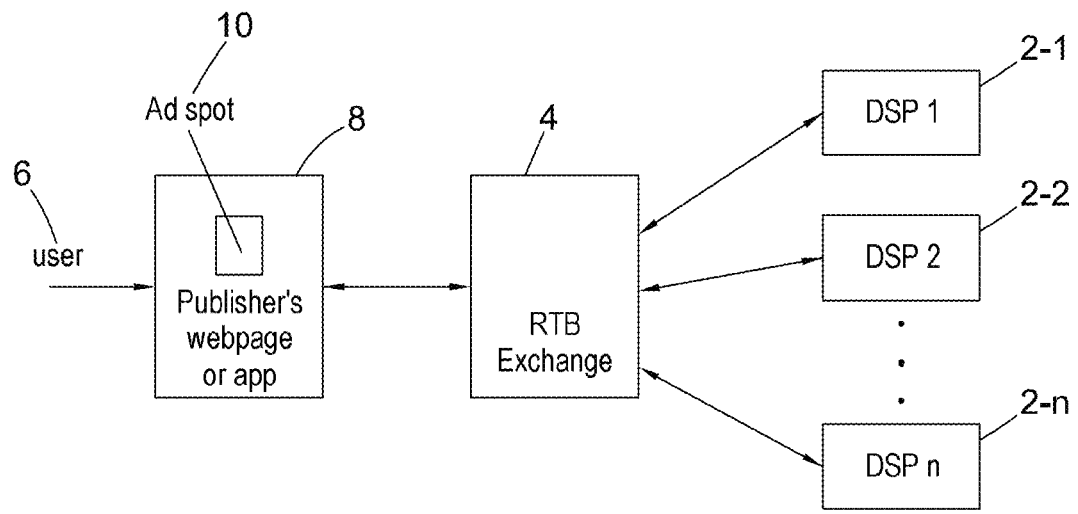
FIG. 1 is a schematic block diagram of a Real-time bidding environment.
Figure 1A:
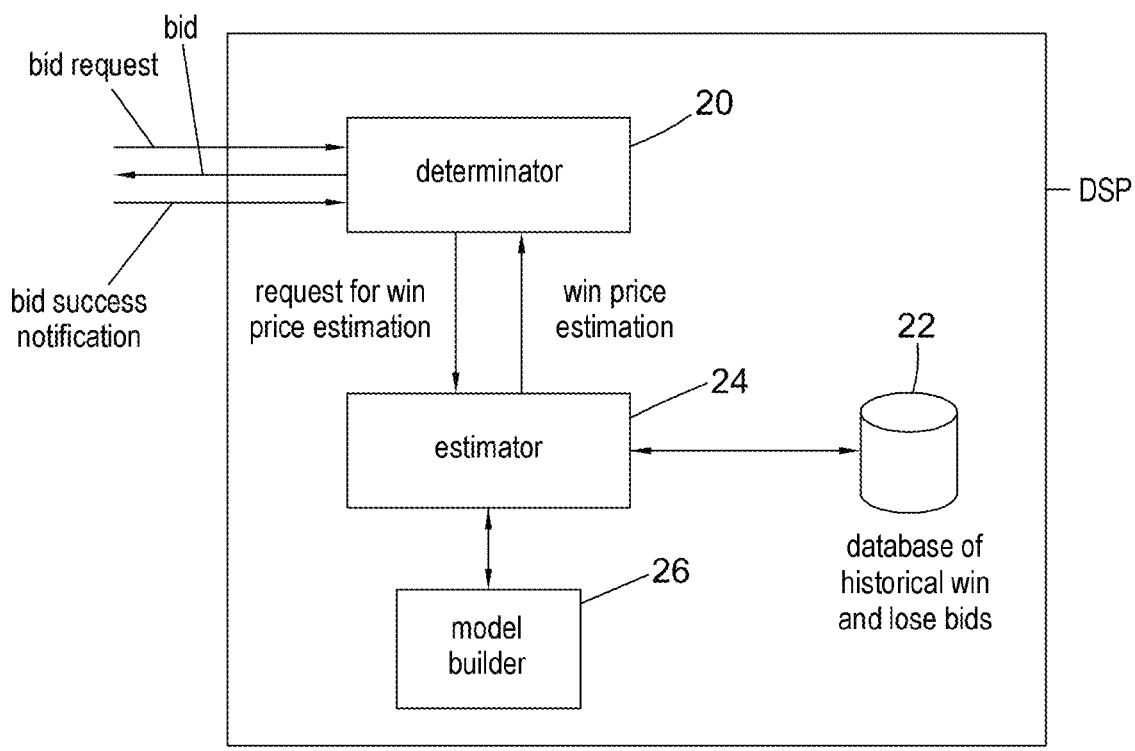
FIG. 1A is a schematic block diagram showing the architecture inside a DSP.

With reference to FIGS. 1 and 1A, a real-time bidding environment has a plurality of Demand Side Platforms (DSPs) 2-1, 2-2, 2-n. The DSPs negotiate, on behalf of advertisers, with an RTB exchange 4 as described in more detail below.

A DSP 2-1 to 2-n listens for ad requests on a particular website or app 8, and then a determinator 20 decides if it wants to bid to serve an ad for that particular person on that particular website or app.

The fundamental steps are as follows:—
1. When a user 6 visits the webpage 8, an impression is created on the publisher's website. While the page loads:
2. An ad request is sent to the Real-time bidding (RTB) exchange 4
3. The RTB exchange 4 queries DSPs for advertisers' bids
4. If the advertiser decides to bid, the bid is generated by the determinator 20 and submitted to the RTB exchange 4, by the relevant DSP
5. The winner is selected at RTB exchanges (based on first or second price auction)
6. The winning notice is sent to the advertiser, via the relevant DSP
7. Following the reversed path, the winner's ad (creative, i.e., the text, picture, or video that the advertiser wants to show to users) 10 is displayed on the webpage for the specific user 6.

To be able to win auctions, the DSPs must be highly responsive and thus need to have ample hardware resource. To conserve this hardware resource, it is thus desirable for a DSP to avoid bidding in an auction it is very unlikely to win. To decide this, any particular DSP 2-1 to 2-n has to have at least an approximate estimation of their competitors' bid price distributions. However this information is not freely available, i.e. at least some of it is "censored". None of the DSPs has information about what their competitors are bidding. This is where predicting the winning price becomes necessary.

However, DSPs only observe the winning price of the bids which they win in auction. In the case when the auction is lost, the winning price is censored, and consequently unobserved. The full winning price distribution consists of the winning prices of all win bids plus the winning prices of all lose bids. Since the latter is missing in the training data, it is challenging to model the winning price. However, in case of losing the auction, the DSP at least knows that the winning price is higher than his own bidding price. That is to say, the DSP knows a lower bound of the winning price for lost bids.

Thus the core problem the DSP has is predicting how much it will need to bid in order to win, but all the information is not readily available for the DSP to be able to easily calculate this.

If a DSP loses a bid then there is no information on what the winning bid was. In this way, data is censored and the core of the invention is a process to be able to accurately estimate the winning bid price when only this censored data is available.

As an example, and with reference also to FIG. 2, in a second price auction, the RTB exchange 4 queries DSP 2-1 and DSP 2-2 for advertisers' bids. The DSP 2-1 bids $1.00, and the DSP 2-2 bids $1.10. Thus DSP 2-2 wins the auction, paying the second highest price, i.e. $1.00. DSP 2-2 receives this as a win notification 12.

DSP 2-1 only receives notification 14 of losing the auction and DSP 2-1 now has incomplete data. It knows the winning bid price was greater than $1.00 but does not know the exact figure.

The bid data is stored in a database 22 of historical win and lose bids and an estimator 24 provides an estimate of a win price as described in detail below, based on the bid information from the database 22 and a selected model from a model builder 26. The model is updated by the model builder 26 as more bids and auctions occur, and the data in the database 22 is thus augmented. This is also described in more detail below.

Commonly, censoring is referred to as left, interval or right In our case, the bid price is right censored about the bid price because the actual winning price is above this value.

A detailed way for a DSP to predict the winning price of an auction is set out below. At a high level, to improve the prediction, the winning price model is generalised to incorporate a gradient boosting framework adapted to learn from both observed and censored data. Gradient boosting combined with censored regression, together can be used to improve winning price prediction.

With reference to FIG. 3, the first step 30 is to construct a set of training data from information gathered from past auctions. Then likelihood functions of respective historical wins and losses are constructed (steps 32 and 34) and combined (step 36) to create an overall loss function. Then, first and second order derivatives of the loss function are calculated (steps 38 and 40). Devising these three parameters in a tractable form means that a machine learning algorithm can then use them to estimate, and therefore predict, accurate bid win prices With reference to FIG. 4, this estimating process is continuous as new auctions continue to operate. This is the process where the loss function and derivatives are used to build a predictive model. This model is regularly updated to use the most recent data. The process is typically executed in a DSP and creates updated training data sets from all historic bid wins and losses, and builds an updated winning bid price prediction model. Thus in step 42, an updated training set is created, and an updated winning price estimate is created and tuned (steps 44 and 46). The model is then deployed in an auction (step 48) and the process loops back to step 42 with new auction price data. It will be appreciated that this loop might not run every time an auction is completed, and may instead be scheduled to run on batches of new data after a predetermined time period or number of auctions has completed.

With this updated estimate, the DSP is now armed with a way of accurately predicting a winning price for the next auction and can thus make a more informed decision whether to commit hardware resource to bidding in the next auction. With reference to FIG. 5, in normal operation, the DSP receives an ad request from the RTB 4 (step 49). It must then score the ad request to determine the predicted win price, and a predicted profit can be calculated. This predicted profit can then be used to determine whether to bid on a specific request in order to meet profit margin goals.

After receiving the ad request the DSP then retrieves advertiser profile information which includes a budget for winning the auction (step 50) and predicts a win price for the next auction (step 52). A decision is then made whether to enter the auction (step 54), which will be mainly, and perhaps exclusively, based on whether the budget is higher than the predicted win price by a desired profit margin. If it is decided to enter the auction, a bid is made to the RTB exchange 4 (step 56).

The DSP may periodically bid to gain additional losing bid information If you don't, can the model drift over time to over-estimating the win price, meaning the DSP never bids. To improve the learnt model, a certain amount of ongoing exploration is desirable, but the majority of bidding should exploit the model so far generated. This is typically managed by algorithms like epsilon greedy (a fixed randomly chosen percentage ignores the predicted win price). A better approach is to use a bandit algorithm such as UCB which varies the amount of exploration according to the uncertainty of the data.

For the machine learning step, two possible variants of gradient boosting are discussed in detail below:—
(i) using linear based learners and,
(ii) using tree base learners, both adapted to censored regression.

Problem Formulation

Suppose there are N DSPs connected to one ad exchange and bidding for incoming ad requests. It is necessary to solve the task of predicting the auction price from the perspective of the $k^{th}$ DSP. To do this means describing the modelling process from the standpoint of $D_k$. For the $i^{th}$ bid represented by feature vector $x_i$, say, $D_k$ is bidding with bidding price $b_i$. The features observed by the DSP usually accommodate information about publisher webpage or app, visiting user, and ad exchange. For $D_k$, the true winning price is the highest bidding price placed by its competitors, i.e. $D_k, \ldots, D_{k-1}, D_{k+1}, \ldots, D_N$. In an RTB auction, $D_k$ has no idea of what the other DSPs are bidding.

As noted earlier, $D_k$ can only observe the true win price in the case when it wins the auction. If another DSP wins a particular auction, then the only information which is known to $D_k$ is the lower bound of win price, i.e., its own bid price denoted by $b_i$. Let us denote $y_i$ as true win price and $w_i$ as observed win price. Suppose that $D_k$ bids higher than its competitor's bidding prices for the $i^{th}$ ad request, then $i^{th}$ bid wins the auction. In this case, the true win price equals the observed win price, i.e., $y_i = w_i$. If $D_k$ bids lower than its competitors' bidding prices, the $i^{th}$ bid loses the auction. That means $b_i$ is <unobserved win price. In this case, the true win price $y_i$ is censored.

In both cases, inspired by linear regression, $y_i$ can be approximated, based only on the available feature vector $x_i$ as follows:

$$y_i = \theta^T x_i + \epsilon \quad (1)$$

Where $\theta \in \mathbb{R}^p$ and denotes a set of regression coefficients where p is the dimension of the feature vector $x_i$. Noise $\epsilon$ can be assumed to be independent and identically distributed from $N(0, \sigma^2)$ distribution. In such cases the true win price $y_i \sim N(\theta^T x, \sigma^2)$.

Let W represent the set of all winning bids and L represent the set of all losing bids.

Now, the likelihood of the winning price model on the observed data is the probability density function:

$$\phi\left(\frac{w_i - \theta^T x_i}{\sigma}\right), \forall i \in W \quad (2)$$

In the case of censored observations, the likelihood function can be expressed in terms of a cumulative density function, denoted by $\Phi$. The reason why a DSP loses an auction is due to bidding lower than the actual unobserved win price. Hence performance is improved by maximizing the probability that the model will predict the win price above the bid price, aka the right censoring point, for lose bids $$P(y_i > b_i) = 1 - P(y_i \leq b_i) \quad \text{Using (1)}$$

$$P(y_i > b_i) = 1 - \Phi\left(\frac{b_i - \theta^T x_i}{\sigma}\right)$$

Thus, the likelihood of the winning price model on the censored data is:

$$\Phi\left(-\left(\frac{b_i - \theta^T x_i}{\sigma}\right)\right), \forall i \in L \quad (3)$$

By taking negative log and combining (2) and (3), the overall negative log-likelihood function is as follows:

$$\sum_{i \in W} -\log \phi\left(\frac{w_i - \theta^T x_i}{\sigma}\right) + \sum_{i \in L} -\log \Phi\left(-\left(\frac{b_i - \theta^T x_i}{\sigma}\right)\right) \quad (4)$$

The coefficient $\theta$ is learned by minimizing equation 4.

Proposed Winning Price Model

The winning price model is generalized by incorporating a gradient boosting framework adapted to censored regression. In the description below, the process is described as Xgboost Censored Regression (XCR).

Gradient Boosting

A boosting mechanism sequentially trains an ensemble of base learners in a forward stage-wise manner. In each stage, each base learner tries to compensate shortcomings (aka error residuals) made by previous learners.

Let (x,y) be input data of N samples, M be the number of boosting iterations and p be the step size. The set of functions $h(x; a_m)$ are base learners, which are learned sequentially using a forward stagewise procedure. More specifically, at each stage, $h(x; a_m)$ is chosen to minimize the loss function, L, using the negative gradient of L at the current model $F_{m-1}$.

---
Algorithm 1 Gradient Boosting
---
1: $F_0(x) = \text{argmin}_\rho \sum_{i=1}^N L(y_i, \rho)$
2: for m = 1 to M do 3: $\hat{y}_i = -\left[\dfrac{\partial L(y_i, F(x_i))}{\partial F(x_i)}\right]_{F(x)=F_{m-1}(x)}, \quad i = 1, \ldots, N$ 4: $a_m = \text{argmin}_{\alpha,\beta} \sum_{i=1}^N [\hat{y}_i - \beta h(x_i; a)]^2$
5: $\rho_m = \text{argmin}_\rho \sum_{i=1}^N L(y_i, F_{m-1}(x_i) + \rho h(x_i; a_m))$
6: $F_m(x) = F_{m-1}(x) + \rho_m h(x; a_m)$
7: end for

Loss Function for XCR

The loss function for gradient boosting censored regression is then generalised based on linear censored regression. In the boosting method, the mean of the true win price y is no longer assumed to depend linearly on the covariates x. Instead $y \sim N(F(x), \sigma^2)$.

For simplicity we define:

$$z_i = \begin{cases} \dfrac{w_i - F(x_i)}{\sigma}, & i \in W \\ \dfrac{b_i - F(x_i)}{\sigma}, & i \in L \end{cases} \quad (5)$$

By replacing $\theta^T x_i$ with $F(x_i)$ in the log-likelihood function defined in (4) and by using the definition in (5), we achieve a loss function for XCR as follows:

$$L(y_i, F(x_i)) = \sum_{i \in W} -\log\phi(z_i) + \sum_{i \in L} -\log\Phi(-z_i) \quad (6)$$

Correct usage of the gradient boosting algorithm requires deriving first and second-order derivatives. In boosting, the gradient descent method updates base learner, i.e. F(x). Hence we derive the loss function w.r.t F(x).

By using definition in Eq. (5) and following the definition of $\phi$ and $\Phi$, let us define:

$$\dfrac{\partial \phi(z_i)}{\partial F(x_i)} = \dfrac{z - i}{\sigma} \phi(z_i) \quad (7)$$

and $$\dfrac{\partial \Phi(-z_i)}{\partial F(x_i)} = \dfrac{\phi(z_i)}{\sigma} \quad (8)$$

First Order Derivative of the Loss Function

By using definition in Eq. (6), the gradient, aka the first order derivative, for one particular observation (xi, yi) is:

$$\dfrac{\partial L(y_i, F(x_i))}{\partial F(x_i)} = -\dfrac{\partial \log\phi(z_i)}{\partial F(x_i)}\mathbb{1}_{\{i \in W\}} - \dfrac{\partial \log\Phi(-z_i)}{\partial F(x_i)}\mathbb{1}_{\{i \in L\}} \quad (9)$$

By using Eq. (7) and Eq. (8):

$$\dfrac{\partial L(y_i, F(x_i))}{\partial F(x_i)} = -\dfrac{z_i}{\sigma}\mathbb{1}_{\{i \in W\}} - \dfrac{1}{\sigma}\dfrac{\phi(z_i)}{\Phi(-z_i)}\mathbb{1}_{\{i \in L\}} \quad (10)$$

Second Order Derivative of the Loss Function $$\dfrac{\partial^2 L(y_i, F(x_i))}{\partial^2 F(x_i)} = -\dfrac{\partial}{\partial F(x_i)}\left(\dfrac{z_i}{\sigma}\right)\mathbb{1}_{\{i \in W\}} - \dfrac{\partial}{\partial F(x_i)}\left(\dfrac{1}{\sigma}\dfrac{\phi(z_i)}{\Phi(-z_i)}\right)\mathbb{1}_{\{i \in L\}} \quad (11)$$

$$\dfrac{\partial^2 L(y_i, F(x_i))}{\partial^2 F(x_i)} = \dfrac{1}{\sigma^2}\mathbb{1}_{\{i \in W\}} - \dfrac{\phi(z_i)}{\sigma^2 \Phi^2(-z_i)}(z_i\Phi(-z_i) - \phi(z_i))\mathbb{1}_{\{i \in L\}} \quad (12)$$

By using definition in Eq. (10), the second part of Eq. (12) can be expressed using only the first derivative:

$$\dfrac{\partial^2 L(y_i, F(x_i))}{\partial^2 F(|x_i)} = \dfrac{1}{\sigma^2}\mathbb{1}_{\{i \in W\}} + \dfrac{1}{\sigma}\dfrac{\partial L(y_i, F(x_i))}{\partial F(x_i)}\left(z_i + \sigma\dfrac{\partial |L(y_i, F(x_i))}{\partial F(x_i)}\right)\mathbb{1}_{\{i \in L\}} \quad (13)$$

Experiments

In this section, effectiveness of the gradient boosting censored regression model (XCR) is investigated, against the non-robust linear censored regression model (LCR). For LCR, we choose the Adam optimizer ("Kingma, D. P., Ba, J.: Adam: A method for stochastic optimization (2014)"), which is an efficient algorithm for first-order gradient-based optimization of stochastic objective functions, based on adaptive estimates of lower-order moments. As noted above, for XCR, we evaluate two variants of gradient boosting. The linear gradient boosting and tree gradient boosting both adapted to censored regression.

For brevity, we refer to these two as XCR1 and XCR2, respectively.

In particular, we describe (i) the dataset preparation and split logic for the experiments, (ii) features used, (iii) evaluation metrics, (iv) hyper-parameters tuning using a validation set, and (v) detailed results showing how XCR outperforms LCR.

Dataset and Preparation.

For training purposes, as DSPs only observe the price of win bids, the winning price for lost bids is not available public datasets. While the censored regression paradigm can be trained by intermingling uncensored (win bids) and censored (lose bids) data, we still need to evaluate algorithm's effectiveness on a test set. Without knowing the ground truth of winning price in lose data, we can not evaluate performance. For the sake of evaluation, we apply a data preparation process. This strategy uses the original win bids data consisting of only observed winning prices, on which we apply the preparation process to produce simulated win bids W and simulated lose bids L as follows. The original bidding price is lowered by 50% and called a new bidding price. If the new bidding price is greater than the original winning price, the corresponding bid is a simulated win bid. If the new bidding price is less than original winning price, the corresponding bid is a simulated lose bid. This mechanism preserves the ground truth of real winning prices both in W and L, and also introduces data censorship by forming L. Censorship is simulated in the dataset as follows, for the training set we use winning prices only for W and the winning prices in L are treated as missing. For evaluation on the test set, we use the ground truth of real winning prices both in W and L.

The statistics of the simulated data is shown in Table 1 and Table 2. In these tables, # of bids is the number of bids in the full simulated data and # of win bids is the number of winning bids in W. WR represents the winning rate calculated by dividing # of win bids by # of bids. AWP is the average winning price on all simulated bids. AWP_W and AWP_L are the average winning price for W and L, respectively.

We now randomly split the data, 90% to the training set and the remaining 10% to the testing set. We do this for each season and each day to produce: (i) for season 1, 7 new data collections which form 7 new training sets and 7 new testing sets, (ii) for season 2, 9 new data collections which form 9 new training sets and 9 new testing sets. We further randomly sample 10% from each training set to form a corresponding validation set to be used for hyperparameter tuning which is described below.

Features

Most features are categorical. Some features such as Region and City are numeric in appearance but not in physical denotation. The features such as AdSlotWidth and AdSlotHeight are numeric not only in appearance but also in physical denotation. However, they represent finite levels which can be treated either by vectorizing into groups or simply as categorical. For simplicity, we process all of them as categorical. These features are then converted to binary features by hashing Evaluation Metrics The root mean squared error (RMSE) and mean absolute error (MAE) are commonly known metrics. The RMSE is widely used as there is good reason to assume that noise follows a Gaussian distribution. While RMSE gives disproportionate weight to large errors, MAE weights equally all the individual absolute differences, therefore is less sensitive to outliers. The choice of metric depends on what is important for the given application. Suppose that a model predicts a win price substantially higher than the true value. Subsequently if a DSP opts to set their bid value unnecessarily high, this may result in a lower or even negative profit margin. Since large errors are particularly undesirable, using RMSE is more valuable than MAE. The smaller the RMSE between true win prices and predicted win prices, better the model.

Theoretically, this metric is possible to evaluate only on win bids data because of the availability of true winning prices. On lose bids data true winning prices are censored. However, described data simulation trick comes to rescue here. Both simulated win bids and simulated lose bids pose true winning prices as ground truth. Hence, we measure the effectiveness of trained censored model both on win bids and lose bids data in the testing set.

Hyper-Parameter Tuning

The training set is used for learning and the validation set, with early stopping, is used to find an optimal set of parameters. The validation performance metric is RMSE, which is the closest approximation of loss function on the simulated iPinYou dataset with high win rate.

Exhaustive search of the hyperparameters space is intractable. Therefore, we decided to limit the parameters to reasonable ranges. We use bayesian optimisation techniques for hyperparameter optimization of all models over these reasonable ranges. For LCR, we tune the initial learning rate and L2 regularization. $\sigma$ is defined as the standard deviation of the true win price. We compute $\sigma$ as the standard deviation of the observed win prices in the training set. In both variants of XCR, XCR1 and XCR2, new base learners are sequentially added to correct the errors made by the existing sequence of base learners. In XCR1, the underlying base learners are linear models, while XCR2 uses tree-based base learners. For both, we tune the learning rate which acts as a weighting factor for the corrections made by the new base learners. For linear gradient boosting we additionally tune L2 and L1 regularization parameters to avoid overfitting. For tree gradient boosting, we additionally optimize (i) the maximum tree depth of the base learners (ii) the gamma parameter to avoid overfitting by adding more constraints on the partition of the leaves in a tree, and (iii) the data and feature sampling for each base learner, so that base learners learn from each other in an optimal manner.

Table 3 presents a sample of optimization results for all three models. When the tuning phase is finished, we build a model again using the optimized parameters running until full convergence is reached. If the model still overfits, the training is stopped. FIG. 6 illustrates that smooth convergence for LCR and XCR2 are achieved. The early stopping mechanism stops learning for XCR1 at approximately the 25th boosting iteration to prevent further overfitting.

Evaluation Results

This subsection presents quantitative results to validate the effectiveness of our algorithm for winning price prediction.

Overall results for each day are listed in Table 4 and Table 5 for season 2 test sets and season 3 test sets, respectively.

Comparison Among Models

The results in Table 4 and Table 5 show the validity of the proposed gradient boosting censored regression model. Both variants, XCR1 and XCR2, outperform linear censored regression, LCR. This holds true for both win bids and lose bids. Between XCR1 and XCR2, XCR2 always outperforms XCR1 for win bids.

Comparison Among Winning Prices

As observed in Table 4 and Table 5, the errors for lose bids are significantly higher than the errors on win bids for all three models. To explore the reason, we look at the average winning price on both winning and losing bids as shown in Table 1 and Table 2. The average win price on lose bids is usually higher than the average win price on win bids for both seasons. This is expected behaviour as the DSP loses auctions by bidding lower than the win price. One can also see that on average the win rates, WR, are approximately 0.83 and 0.74 for season 2 and season 3, respectively. This introduces a skewed distribution biased more towards win bids. This makes it more difficult for censored regression to predict lose bids in comparison to win bids.

Comparison Among Predictions

One key advantage of using a tree-based boosting approach is to produce relatively stable predictions. In our application, the win price cannot sensibly take negative values, and such a prediction is clearly incorrect. Linear models are prone to behave arbitrarily beyond the domain spanned by training examples. To circumvent this disadvantage, one can set a threshold such that if a predicted win price is beyond that threshold, it is assigned the minimum/maximum acceptable value. This still requires manual adjustment and does not make predictions very accurate. FIG. 7, which is from day 2013 Oct. 21, illustrates the linear models (in this example LCR and XCR1) not respecting the known bounds of win price. I.e., few predictions are negative. Although it is hard to see in the density plot because the overall contribution is small; LCR and XCR1 produce 0.062% and 0.02% negative predictions in the test data, respectively. In this particular example, XCR2 does not produce any negative predictions. Although the tree based boosting methods can also predict negative values, the overall contribution is less than in the linear case.

FIG. 7 also adds supporting evidence the prediction density of XCR2 captures the true win price considerably better than the other two models. This is also shown in the overall results in terms of RMSE.

Our work generalizes the winning price model to incorporate a gradient boosting framework to learn from both observed win bids and censored lose bids. For example, predictions that come from our model are learned from both win and lose bids. We could then learn a simpler uncensored model, which will be trained only on win bids, to weight predictions by winning rate to form the mixture model. Hence, this work extends flexibility in various ways. We have compared our reported RMSE to theirs on several days from both season 2 and season 3. (They actually used MSE in figures, but it is easy to compare on the same scale of RMSE.) Our gradient boosting censored regression, particularly tree-based XCR2, outperformed the results of linear censored regression on most days.

An example of Python code to implement the invention using the xgboost machine learning algorithm. is set out below:—

```
#Custom objective for Second Order Gradient Boosting
#preds: predictions made in each iteration by boosting mechanism
#dtrain: training data in Dmatrix format to be used by xgboost
def censored_obj(self, preds, dtrain):
    labels = dtrain.get_label( ) #w for win bids data (win price), b for lose bids (bid price)
    is_win = dtrain.get_is_win( ) #1 for win bids, 0 for lose bids
    sigma = np.std(labels[is_win==1]) #standard deviation of winning price from training data
    z = 1.*(labels − preds) / sigma
    #pdf/cdf is same as exponential of (log(pdf) − log(cdf)
    grad_lose = −1.*np.exp(norm.logpdf(z) − norm.logcdf(−1.*z))/sigma
    grad_win = −1.*z/sigma
    #gradient: 1st order derivative
    grad = (1-is_win) * 1.*grad_lose + is_win * 1.*grad_win
    #hessian: 2nd order derivative
    hess = ((1-is_win) * (1.*sigma*(grad_lose**2) + 1.*grad_lose*z) / sigma) + (1.*is_win / sigma** 2)
    return grad, hess
# Example how xgboost uses our custom objective function, censored_obj
def fit(self, dtrain, dvalid):
    param = {'max_depth': self.max_depth,
        'eta': self.learning_rate,
        'num_boost_round': self.n_booster}
    #dtrain: training data in Dmatrix format
    #dvalid: validation data in Dmatrix format (used for early_stopping)
    watchlist = [(dtrain,'train'), (dvalid,'eval')]
    logging.info("Fitting in process...")
    #eval_result and evalerror are for monitoring purpose, i.e. performance after each boosting iteration
    self.model = xgb.train(param, dtrain, self.n_booster, watchlist,
        obj = self.censored_obj, feval = self.evalerror,
        evals_result = self.eval_result, early_stopping_rounds = 50)
```

The invention claimed is:

1. A computer program product comprising instructions which, when the program is executed by a computer, cause the computer to carry out steps of:
   (a) receiving historical data on the winning bids of previous auctions and also the losing bids of previous auctions and estimating the likely win price for a future auction,
   (b) receiving data on a maximum bid for winning a future auction and the estimated win price from the estimator, and causing the hardware resource to be employed in entering the future auction only when a budget is not less than the estimated win price,
   (c) creating a set of training data from the historical data on the winning bids and the losing bids, calculating an overall loss function based on the set, and calculating first and second order derivatives of the overall loss function to generate a win price model,
   (d) using the data that is most recent to create an updated training data set, and
   (e) using the updated training data set to generate an updated win price model, wherein the computer carries out a further step of calculating a likelihood function of historical wins and a likelihood function of historical losses and combining these functions to create the overall loss function, and
   (f) receiving a profit margin goal which is used to adjust the estimated win price to ensure that auctions are only won with a sufficient profit margin.

2. A computer program product comprising instructions which, when the program is executed by a computer, cause the computer to carry out steps of:
   (a) receiving historical data on the winning bids of previous auctions and also the losing bids of previous auctions and estimating the likely win price for a future auction,
   (b) receiving data on a maximum bid for winning a future auction and the estimated win price from the estimator, and causing the hardware resource to be employed in entering the future auction only when a budget is not less than the estimated win price,
   (c) creating a set of training data from the historical data on the winning bids and the losing bids, calculating an overall loss function based on the set, and calculating first and second order derivatives of the overall loss function to generate a win price model,
   (d) using the data that is most recent to create an updated training data set,
   (e) tuning the updated win price model using a number M of boosting iterations of training, calculating the win price model, creating the updated training data set, and calculating the updated win price model, and
   (f) using the updated training data set to generate an updated win price model, wherein an early stopping mechanism stops learning so that M equals approximately 25, wherein M is greater than or equal to 1, and wherein the computer carries out a further step of calculating a likelihood function of historical wins and a likelihood function of historical losses and combining these functions to create the overall loss function.

3. The computer program product of claim 2, wherein tuning comprises tuning a learning rate that acts as a weighting factor for corrections made during the tuning.

4. A data processing apparatus for minimizing usage of computer hardware resources in an automated real-time auction, comprising a machine learning estimator configured to calculate a likelihood function of historical wins, the machine learning estimator further configured to calculate a likelihood function of historical losses, the machine learning estimator further configured to carry out steps of:
   (a) receiving historical data on the winning bids of previous auctions and also the losing bids of previous auctions and estimating the likely win price for a future auction,
   (b) receiving data on a maximum bid for winning a future auction and the estimated win price from the estimator, and causing the hardware resource to be employed in entering the future auction only when a budget is not less than the estimated win price,
   (c) creating a set of training data from the historical data on the winning bids and the losing bids, calculating an overall loss function based on the set, and calculating first and second order derivatives of the overall loss function to generate a win price model,
   (d) using the data that is most recent to create an updated training data set, and
   (e) using the updated training data set to generate an updated win price model, wherein the computer carries out a further step of calculating a likelihood function of historical wins and a likelihood function of historical losses and combining these functions to create the overall loss function, and
   (f) receiving a profit margin goal which is used to adjust the estimated win price to ensure that auctions are only won with a sufficient profit margin.

5. A data processing apparatus for minimizing usage of computer hardware resources in an automated real-time auction, comprising a machine learning estimator configured to calculate a likelihood function of historical wins, the machine learning estimator further configured to calculate a likelihood function of historical losses, the machine learning estimator further configured to carry out steps of:
   (a) receiving historical data on the winning bids of previous auctions and also the losing bids of previous auctions and estimating the likely win price for a future auction,
   (b) receiving data on a maximum bid for winning a future auction and the estimated win price from the estimator, and causing the hardware resource to be employed in entering the future auction only when a budget is not less than the estimated win price,
   (c) creating a set of training data from the historical data on the winning bids and the losing bids, calculating an overall loss function based on the set, and calculating first and second order derivatives of the overall loss function to generate a win price model,
   (d) using the data that is most recent to create an updated training data set,
   (e) tuning the updated win price model using a number M of boosting iterations of training, calculating the win price model, creating the updated training data set, and calculating the updated win price model, and
   (f) using the updated training data set to generate an updated win price model, wherein an early stopping mechanism stops learning so that M equals approximately 25, wherein M is greater than or equal to 1, and wherein the computer carries out a further step of calculating a likelihood function of historical wins and a likelihood function of historical losses and combining these functions to create the overall loss function.

6. A method of minimizing usage of computer hardware resource in an automated real-time auction, comprising the steps of:
   (a) receiving historical data on the winning bids of previous auctions and also the losing bids of previous auctions and estimating the likely win price for a future auction,
   (b) receiving data on a maximum bid for winning a future auction and the estimated win price from the estimator, and causing the hardware resource to be employed in entering the future auction only when a budget is not less than the estimated win price,
   (c) creating a set of training data from the historical data on the winning bids and the losing bids, calculating an overall loss function based on the set, and calculating first and second order derivatives of the overall loss function to generate a win price model,
   (d) using the data that is most recent to create an updated training data set, and
   (e) using the updated training data set to generate an updated win price model, wherein the computer carries out a further step of calculating a likelihood function of historical wins and a likelihood function of historical losses and combining these functions to create the overall loss function, and
   (f) receiving a profit margin goal which is used to adjust the estimated win price to ensure that auctions are only won with a sufficient profit margin.

7. A method of minimizing usage of computer hardware resource in an automated real-time auction, comprising the steps of:
   (a) receiving historical data on the winning bids of previous auctions and also the losing bids of previous auctions and estimating the likely win price for a future auction,
   (b) receiving data on a maximum bid for winning a future auction and the estimated win price from the estimator, and causing the hardware resource to be employed in entering the future auction only when a budget is not less than the estimated win price,
   (c) creating a set of training data from the historical data on the winning bids and the losing bids, calculating an overall loss function based on the set, and calculating first and second order derivatives of the overall loss function to generate a win price model,
   (d) using the data that is most recent to create an updated training data set,
   (e) tuning the updated win price model using a number M of boosting iterations of training, calculating the win price model, creating the updated training data set, and calculating the updated win price model, and
   (f) using the updated training data set to generate an updated win price model, wherein an early stopping mechanism stops learning so that M equals approximately 25, wherein M is greater than or equal to 1, and wherein the computer carries out a further step of calculating a likelihood function of historical wins and a likelihood function of historical losses and combining these functions to create the overall loss function.

* * * * *